Aug. 10, 1943.  H. G. KING  2,326,364
LIGHTING DEVICE
Filed April 6, 1938   2 Sheets-Sheet 1
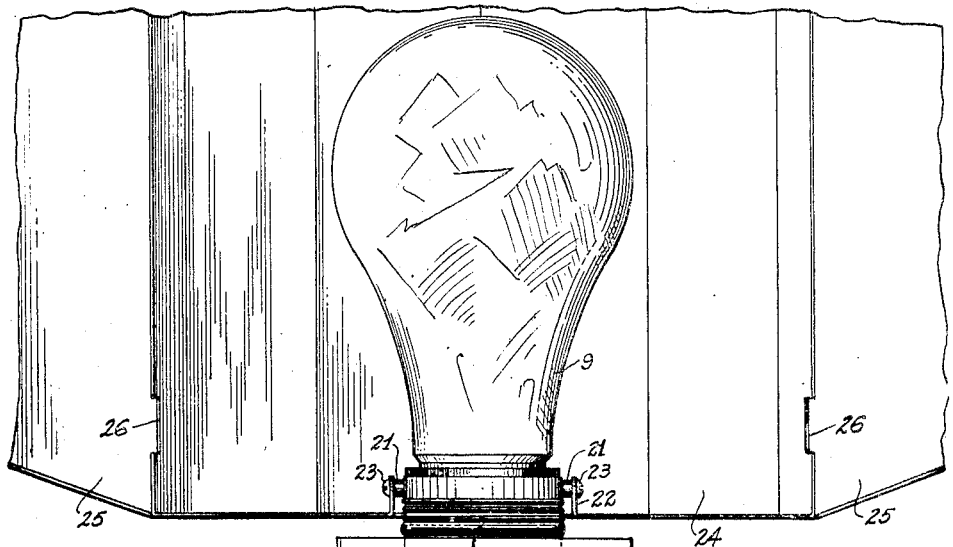
FIG. 1
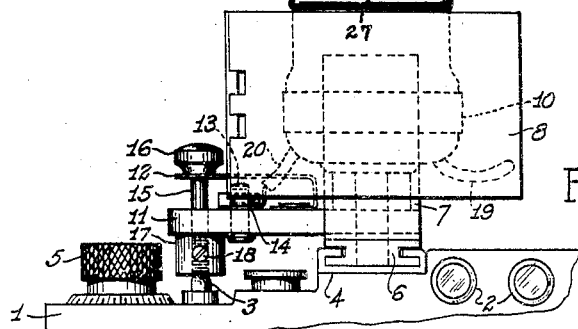
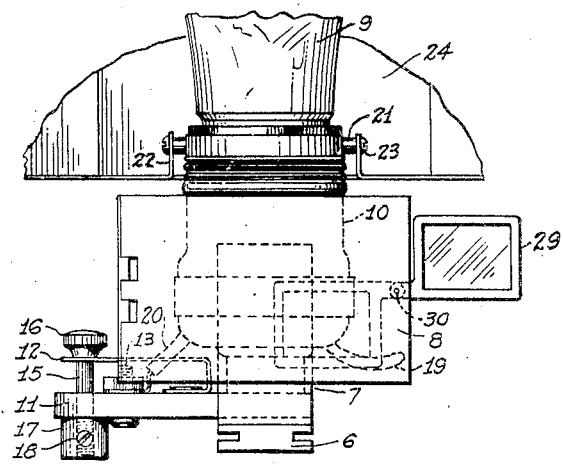
FIG. 4
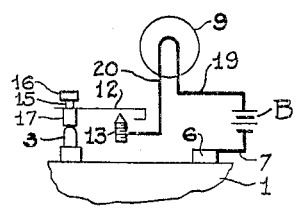
FIG. 7
INVENTOR.
Henry G. King
BY Hawgood and Van Horn
ATTORNEYS Aug. 10, 1943.   H. G. KING   2,326,364
LIGHTING DEVICE
Filed April 6, 1938   2 Sheets-Sheet 2
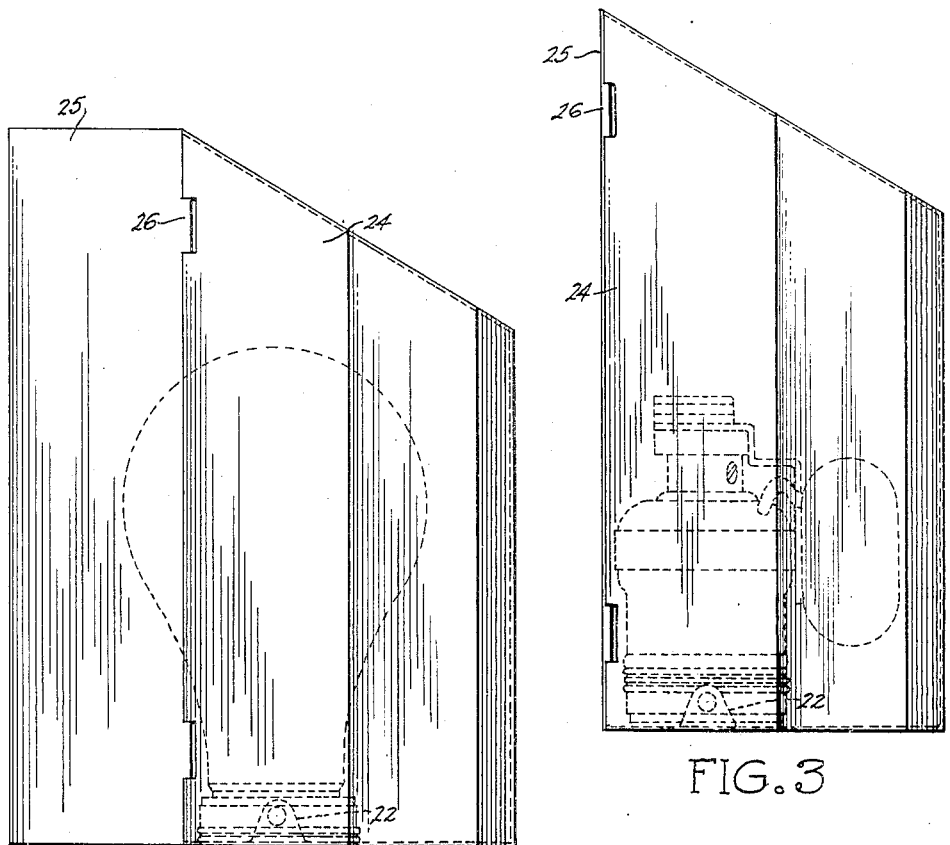
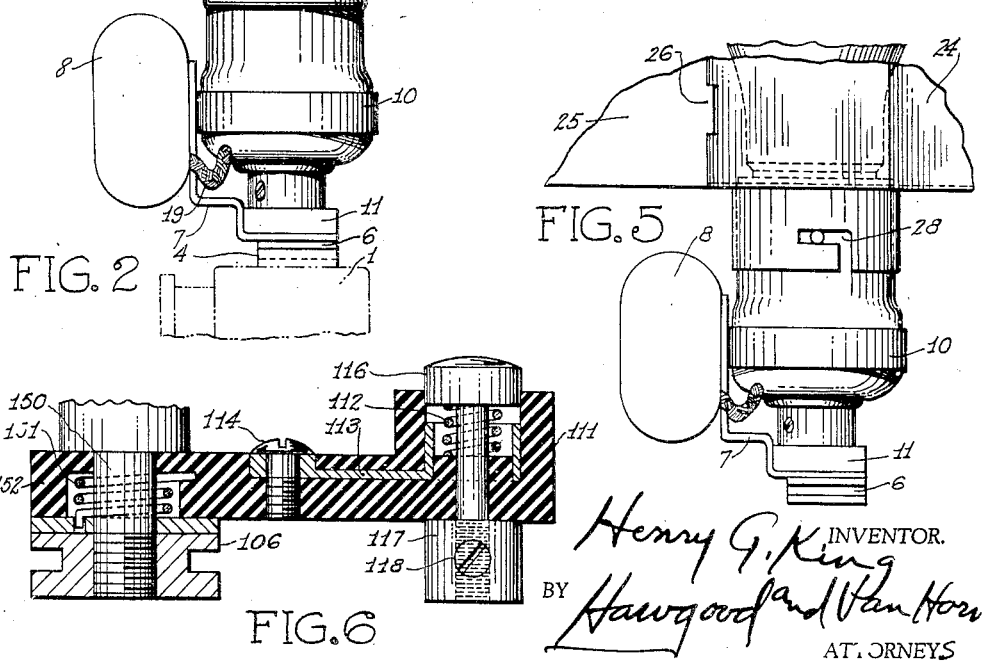

Patented Aug. 10, 1943

2,326,364

UNITED STATES PATENT OFFICE 2,326,364

LIGHTING DEVICE

Henry G. King, Lorain, Ohio

Application April 6, 1938, Serial No. 200,478

4 Claims. (Cl. 67—29)

This invention relates to lighting or igniting devices, and is particularly adapted to the operation of flashlights and the like, such as are used in conjunction with the operation of a camera in the taking of photographs indoors or in other places or at times when artificial light is required.

An object of the invention is to provide an improved apparatus which will actuate a mechanical device and simultaneously control an electrical circuit.

Another object is to provide an improved apparatus which may be conveniently handled.

Another object is to provide an improved apparatus which will be compact and convenient.

Another object is to provide an improved apparatus which may be easily operated.

Another object is to provide an improved apparatus which will accurately synchronize the operation of two devices.

Another object is to provide an improved apparatus which may be easily carried or stored.

Another object is to provide an improved apparatus which will consist of few and simple parts.

Another object is to provide an improved apparatus which may be easily and readily manufactured.

Another object is to provide an improved apparatus which may be attached to cameras and other devices without alteration of their mechanisms.

Another object is to provide an improved apparatus which will not interfere with the operating mechanism of devices to which it is attached.

Another object is to provide an improved apparatus which will be neat and attractive in appearance.

Another object is to provide an improved apparatus which may be readily applied and adjusted.

Other objects will hereinafter appear.

The invention will be readily understood from the description of several practical embodiments thereof, illustrated in the accompanying drawings, in which:

Figure 1 is a fragmentary front elevation of the device applied to one popular type of camera;

Figure 2 is a side elevational view of the device of Figure 1;

Figure 3 shows the device of Figures 1 and 2 in folded position;

Figure 4 is a fragmentary front elevation of the device of Figures 1 to 3;

Figure 5 illustrates the use of this device with a different type of bulb and reflector;

Figure 6 is a fragmentary sectional view showing another embodiment of the invention; and Figure 7 is a diagrammatic illustration of the electric circuit of the devices shown.

In photography indoors or at night, it has sometimes been customary to expose a negative film or plate in cameras by subjecting the object being photographed to relatively intense lighting by means of flashlight. At first, these flashlights consisted of magnesium powder or the like, which was ignited with a match or fuse, but more recently special electrically ignited bulbs have been used.

It is well known that a camera may be placed in position, focused, and its shutter opened just before creating the flash of either the powder or the bulb, and the exposure will be recorded solely by the illumination provided by the flash light. However, with better lenses and shutters, and because of the unavoidable variation in the time of intense illumination of the flash producing devices, it is found highly desirable that, instead of leaving the camera shutter open while the flash is ignited, the shutter be arranged to mechanically open and close, the opening and closing being separated by a predetermined time interval, and this time interval be synchronized with the flash to take place only during the maximum intensity of illumination.

For this purpose some rather elaborate and complicated timing devices have been produced, some requiring mounting the light at a point remote from the camera, some necessitating attachments to the shutter mechanism, and others including delay mechanism.

The present invention provides a device which may be easily positioned upon the top of a camera without any alteration in the mechanism thereof, which device, while occupying little space and not affecting materially the balance or interfering with the use of the finder or operating mechanism thereof, will both ignite an electrically operated flash bulb and also the usual shutter operating mechanism of the camera, these two being so timed that the correct exposure will be produced during the period of maximum intensity of illumination.

In Figures 1 and 2 of the drawings is shown a portion of a camera of a type now very popular, which includes a fast and efficient lens and a relatively fine shutter mechanism. The frame of the camera is indicated generally at 1, while on the top thereof are the finding devices 2, the shutter actuating button 3, and usually a channel-shaped holder 4 which is provided for the purpose of receiving auxiliary finding devices for use with special lenses. The film feeding knob is shown at 5.

Upon this camera is mounted a device embodying the present invention. It consists of a suporting base 6 adapted to be readily attached and detached by having its lower flange inserted in the channel-shaped holder 4 of the camera, and upon this base are carried all the elements of the flash light actuating mechanism, these being mounted directly and rigidly to the base portion 6 in the embodiment shown in Figures 1 and 2 and pivotally mounted thereon in that of Figure 6.

A bracket 7 extends forwardly and upwardly and supports a casing 8 in which may be positioned batteries for furnishing the current to ignite the flash bulb 9. This bulb is received in the socket 10 of more or less conventional type, such as an Edison base socket, supported directly above the supporting base upon an insulating arm 11 extending laterally and overlying the usual shutter actuating button 3.

Mounted upon this arm is a spring contact 12 and an adjustable stationary contact shown as consisting of a screw 13 and nut 14 interposed in the path of the spring contact.

Passing through the spring contact is an actuating plunger 15 having at its upper end a head 16 overlying the spring contact, the plunger extending through the insulating arm 11 and being provided at its lower end with an adjustable pressure transmitting member 17 held in adjustable position by a set screw 18 and arranged to directly actuate the shutter actuating button 3.

Conductors 19 and 20 extend from the socket 10 to the battery in box 8 and to the stationary contact 13 while the other end of the battery is grounded through the casing 8 and bracket 7 to the camera frame, so that when the spring contact 12 is brought into engagement with the stationary contact 13 it closes a circuit from battery B through conductor 19 to the socket 10 and bulb 9, then through conductor 20 to the stationary contact 13, through spring contact 12, actuating plunger 15, through the shutter operating mechanism 3 to the metallic frame 1 of the camera, through to the supporting base 6, through the bracket 7 and casing 8, back to the other terminal of the battery B.

Thus it will be seen that it is impossible to accidentally ignite the bulb when the attachment has been removed from the camera.

It will also be seen that a single motion of the actuating plunger 16 closes the contacts to supply current to ignite the bulb and also actuates the camera shutter. Synchronism of the flash and the shutter movement may be easily varied by merely adjusting the stationary contact 13 so that it is touched by the spring contact sooner or later in its downward motion, as may be desired.

Upon the sides of the socket are two bosses 21 to which are secured lugs 22 by means of screws 23, which act as trunnions and by which a reflector 24 is pivotally connected so that it may be swung into extended position behind the bulb as indicated in Figures 1 and 2, or when not in use, and when the bulb has been removed, it may be swung around to enclose the parts of the mechanism which are being removed from the camera as shown in Figure 3.

The top, back, and parts of the sides of the reflector are made integral, while the outermost parts of the sides 25 are hinged thereto at 26, and may be folded in to enclose the mechanism as in Figure 3.

Thus it will be seen that the entire device may be brought into very small compass for carrying, and may be readily slipped in the pocket of the user.

When it is desired to use larger bulbs, a larger reflector will be needed, and this may be supported either by the trunnion screws as is the case of the smaller reflector, or it may be attached directly to the exterior of the socket as by a thread 27 formed thereon and corresponding thread in the neck of the reflector, or by means of the bayonet joint 28 shown in Figure 5.

Inasmuch as the ordinary finding mechanism of a camera of the type illustrated is adapted to only one lens, and inasmuch as telephoto, wide angle, and other special types of lenses are frequently used with such cameras, it has been customary to provide, in addition to the usual finder, rectangular frames which will indicate to the operator the size of the picture being taken. These have been inserted in the channel-shaped attachment 4 at the top of the camera.

To take the place of the usual frames when the lighting attachment is used on the camera, I have provided a series of frames 29 mounted upon a horizontal pivot 30 which may be conveniently positioned between the bulb socket 10 and the battery case 8 when not in use, and when any frame is desired, it may be swung laterally about this pivot to the position shown in Figure 4 where it will accurately indicate to the operator the field which will be within the exposure he is about to make. Of course, when special lenses are not being used, the frames will be positioned between the battery case and the socket out of the way, and the ordinary finding mechanism used instead.

In Figure 6, the base 106, instead of being rigidly connected to the parts which it supports, is pivotally connected thereto, these parts being able to rotate about the vertical pivot 150 and urged into their normal position by means of a spring 151. This arrangement is particularly advantageous for some types of cameras in which the film winding mechanism and the like is positioned on the top where it would be obstructed by the arm or the battery case. It will be apparent that when it is desired to actuate this winding mechanism, it is only necessary to rotate the lighting attachment about the pivot and to wind the film, after which the spring will reurn the lighting attachment to normal position, a stop 152 being provided to positively locate arm 111 with the actuating plunger 117 in alinement with the shutter actuating button.

In this embodiment, the leaf spring contact has been replaced by a helical spring 112 contained within a recess in the molded arm 111, and bearing on the under side of the actuator 116.

A stationary contact 113 is molded into the arm and provided with a binding post screw 114 by which the wire from the lamp socket may be clamped to it, the end of the stationary contact being spaced from spring 112, but interposed in the path of the lower end of actuator 116.

The adjustment of contactor 117 may be effected by set screw 118, or in any other desired and well known manner.

While I have described the illustrated embodiments of my invention in some particularity, obviously many others will readily occur to those skilled in this art, and I do not, therefore, limit myself to the precise details shown and described, but claim as my invention all embodiments, variations, and modifications thereof coming within the scope of the appended claims.

I claim:

1. A self-contained lighting and shutter operating attachment for cameras comprising a bulb receiving socket, a holder for a source of electrical energy, and a reflector, the socket and holder being fixed relative each other and pivotally connected with the reflector, the pivotal axis being substantially parallel to the open side of the reflector and the relatively fixed parts being embraced by the part of the reflector to which the pivotal connection is made whereby the holder and socket may be moved about this axis to be housed within the reflector.

2. A readily attachable shutter and photoflash synchronizing device for cameras having a shutter trigger on the camera case and a viewfinder clip adjacent thereto comprising: switch mechanism including a pair of contacts and having means receivable in said viewfinder clip for quickly and readily attaching the same on the camera case in a predetermined fixed position; manually movable means carried by said switch mechanism and operatively connected to one of said contacts and having a portion in operating alignment with said shutter trigger when said switch mechanism is in said predetermined fixed position.

3. A readily attachable shutter and photoflash synchronizing device for cameras having a shutter trigger on the camera case and a viewfinder clip adjacent thereto comprising: switch mechanism including a pair of contacts and having means receivable in said viewfinder clip for quickly and readily attaching the same on the camera case in a predetermined fixed position, a shutter trigger actuating element in operating alignment with said shutter trigger when said switch mechanism is in said predetermined fixed position, means comprising a manually operable member for closing said contacts and operating said element, and means for adjusting said element and said contacts relative to each other.

4. A self-contained, readily attachable, photoflash light holder and shutter-flashlight synchronizing device for cameras having a shutter trigger on the camera case and a viewfinder clip adjacent thereto comprising: switch mechanism including a pair of contacts and having means receivable in said viewfinder clip for quickly and readily attaching the same on the camera case in a predetermined fixed position, manually movable means carried by said switch mechanism and operatively connected to one of said contacts and having a portion in operating alignment with said shutter trigger when said switch mechanism is in said predetermined fixed position; a battery, a photoflash lamp, and a reflector carried by said switch mechanism; and means connecting said battery and said lamp in series circuit with said contacts.

HENRY G. KING.